US012671135B2

(12) United States Patent
Wong et al.

(10) Patent No.: US 12,671,135 B2
(45) Date of Patent: Jun. 30, 2026

(54) STRUCTURAL SENSELINE ASSEMBLY WITH SPLIT INTERCONNECT BOARD FOR BATTERY CELL ARRAY

(71) Applicant: GM GLOBAL TECHNOLOGY OPERATIONS LLC, Detroit, MI (US)

(72) Inventors: Annabella Wong, Clawson, MI (US); Mitchell Stojanovski, Birmingham, MI (US); Nicholas Compton, Freeland, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 649 days.

(21) Appl. No.: 18/300,478

(22) Filed: Apr. 14, 2023

(65) Prior Publication Data

US 2024/0347844 A1      Oct. 17, 2024

(51) Int. Cl.
| | |
|---|---|
| *H01M 50/284* | (2021.01) |
| *B60L 50/64* | (2019.01) |
| *H01M 10/48* | (2006.01) |
| *H01M 50/213* | (2021.01) |
| *H01M 50/507* | (2021.01) |
| *H01M 50/519* | (2021.01) |

(52) U.S. Cl.
CPC ........... *H01M 50/284* (2021.01); *B60L 50/64* (2019.02); *H01M 10/482* (2013.01); *H01M 50/213* (2021.01); *H01M 50/507* (2021.01); *H01M 50/519* (2021.01); *H01M 2220/20* (2013.01)

(58) Field of Classification Search
CPC ............. H01M 50/284; H01M 50/519; H01M 50/507; H01M 50/213; H01M 10/482; H01M 2220/20; B60L 50/64
See application file for complete search history.

(56) References Cited

U.S. PATENT DOCUMENTS

| | | | | | |
|---|---|---|---|---|---|
| 9,520,587 | B2 * | 12/2016 | DeKeuster | .......... | H01M 50/249 |
| 11,018,381 | B2 * | 5/2021 | Dawley | .............. | H01M 10/425 |
| 2010/0000816 | A1 * | 1/2010 | Okada | ................ | H01M 50/209 |
| | | | | | 180/68.5 |

(Continued)

FOREIGN PATENT DOCUMENTS

| | | | | | |
|---|---|---|---|---|---|
| EP | | 3671895 A1 * | 6/2020 | .......... | H01M 10/482 |
| EP | | 4539227 A1 * | 4/2025 | .......... | H01M 50/507 |

*Primary Examiner* — Matthew J Merkling
(74) *Attorney, Agent, or Firm* — Quinn IP Law

(57) ABSTRACT

A multi-cell rechargeable energy storage system (RESS) includes an enclosure having a tray and a cover with battery cells mounted to the tray and a structural senseline assembly having a busbar subassembly for connecting the battery cells. The senseline assembly also includes a sensing device for detecting operation of the battery cell(s) and a sensing circuit connected to the busbar subassembly and to the sensing device for communicating electrical signals therefrom to an external controller. The senseline assembly additionally includes a first interconnect board (ICB) disposed between the battery cells and the busbar subassembly to position the sensing circuit, the busbar subassembly, and the sensing device, and electrically isolate the busbar subassembly from the cells. The senseline assembly further includes a second ICB disposed between the cover and the busbar subassembly and structurally connecting the cover to the first ICB to transmit physical forces between the cover and the tray.

20 Claims, 6 Drawing Sheets

(56)                    References Cited

U.S. PATENT DOCUMENTS

| | | | | |
|---|---|---|---|---|
| 2017/0012331 A1* | 1/2017 | Ng | .................... | H01M 10/0422 |
| 2018/0083251 A1* | 3/2018 | Newman | ................... | B60L 3/04 |
| 2018/0190960 A1* | 7/2018 | Harris | .................. | H01M 50/20 |
| 2018/0287111 A1* | 10/2018 | Fukuoka | ............. | H01M 50/289 |
| 2019/0296310 A1* | 9/2019 | Newman | ............ | H01M 50/516 |
| 2019/0386269 A1* | 12/2019 | Taylor | ................ | H01M 10/625 |
| 2021/0057708 A1* | 2/2021 | Castillo | .................. | B60L 50/66 |
| 2021/0408514 A1* | 12/2021 | Sohag | ................ | H01M 10/613 |
| 2024/0396147 A1* | 11/2024 | Trigg | ................. | H01M 50/507 |
| 2025/0192305 A1* | 6/2025 | Okuno | .............. | H01M 50/209 |
| 2025/0192334 A1* | 6/2025 | Maeda | ............... | H01M 50/209 |

* cited by examiner

STRUCTURAL SENSELINE ASSEMBLY WITH SPLIT INTERCONNECT BOARD FOR BATTERY CELL ARRAY

INTRODUCTION

The present disclosure relates to a structural senseline assembly with a split interconnect board (ICB) for a cell array.

Batteries may be broadly classified into primary and secondary batteries. Primary batteries, also referred to as disposable batteries, are intended to be used until depleted, after which they are simply replaced with new batteries. Secondary batteries, more commonly referred to as rechargeable batteries, employ specific chemistries permitting such batteries to be repeatedly recharged and reused, therefore offering economic, environmental, and ease-of-use benefits compared to disposable batteries. A multi-cell rechargeable energy storage system (RESS) typically includes a battery cell array, such as a battery module, pack, etc., plurality of secondary battery cells in relatively close proximity to one another.

A large RESS may be used to store electrical energy for future use and as a buffer between peak power generation and peak system loads, such as in stationary energy storage systems and electric vehicles (EVs). To meet design objectives of charging rates, peak output power, and capacity, secondary batteries may be organized into battery systems or arrays with battery cells connected in parallel and/or in series and enclosed into battery module and/or pack housings. Such an RESS typically includes an enclosure for housing individual battery cells, and various internal components, such as an interconnect board (ICB) for linking the battery cells, sensing and communication components, and an electrical busbar establishing connections therebetween.

SUMMARY

A multi-cell rechargeable energy storage system (RESS) includes an RESS enclosure surrounded by an external environment and having an enclosure tray and an enclosure cover. The RESS also includes a plurality of battery cells arranged in one or more battery modules and mounted to the enclosure tray. The RESS additionally includes a structural senseline assembly having a busbar subassembly disposed within the RESS enclosure and configured to electrically connect the plurality of battery cells. The structural senseline assembly also includes a sensing device disposed within the RESS enclosure and configured to detect operation of at least one of the plurality of battery cells. The structural senseline assembly additionally includes a sensing circuit disposed within the enclosure and electrically connected to each of the busbar subassembly and the sensing device to communicate electrical signals therefrom to an electronic controller arranged in the external environment. The structural senseline assembly also includes a first or lower interconnect board (ICB) disposed between the plurality of battery cells and the busbar subassembly and configured to position the sensing circuit and the busbar subassembly within the structural senseline assembly and electrically isolate the busbar subassembly from the plurality of battery cells. The subject arrangement of the first ICB also positions the sensing device relative to the busbar subassembly and the structural senseline assembly to the plurality of battery cells. The structural senseline assembly further include a second or upper ICB disposed between the enclosure cover and the busbar subassembly and configured to structurally connect the enclosure cover to the first ICB and transmit physical forces between the enclosure cover and the enclosure tray.

The RESS may also include an adhesive layer disposed between the enclosure cover and the second ICB.

At least one of the first ICB and the second ICB may include one or more ribs configured to transfer the physical forces between the first and the second ICBs.

The RESS may additionally include either an adhesive layer or a weld interface disposed between the first ICB and the second ICB.

The weld interface may be an ultrasonic weld, a laser weld, or a heat stake.

The RESS may also include an adhesive layer disposed between the second ICB and the busbar subassembly.

The physical forces may be transmitted through the first ICB, the second ICB. and the plurality of battery cells.

The structural senseline assembly may define an open space between the sensing device and the enclosure cover.

The structural senseline assembly may additionally define an open space between the sensing device and the second ICB.

The first ICB may include one or more ribs configured to support the sensing circuit.

A motor vehicle having a power-source and the above-disclosed RESS configured to supply electric energy to the power-source is also disclosed.

The above features and advantages, and other features and advantages of the present disclosure, will be readily apparent from the following detailed description of the embodiment(s) and best mode(s) for carrying out the described disclosure when taken in connection with the accompanying drawings and appended claims.

DETAILED DESCRIPTION

Those having ordinary skill in the art will recognize that terms such as "above", "below", "upward", "downward", "top", "bottom", "left", "right", etc., are used descriptively for the figures, and do not represent limitations on the scope of the disclosure, as defined by the appended claims. Furthermore, the teachings may be described herein in terms of functional and/or logical block components and/or various processing steps. It should be realized that such block components may be comprised of a number of hardware, software, and/or firmware components configured to perform the specified functions.

Figure 1:
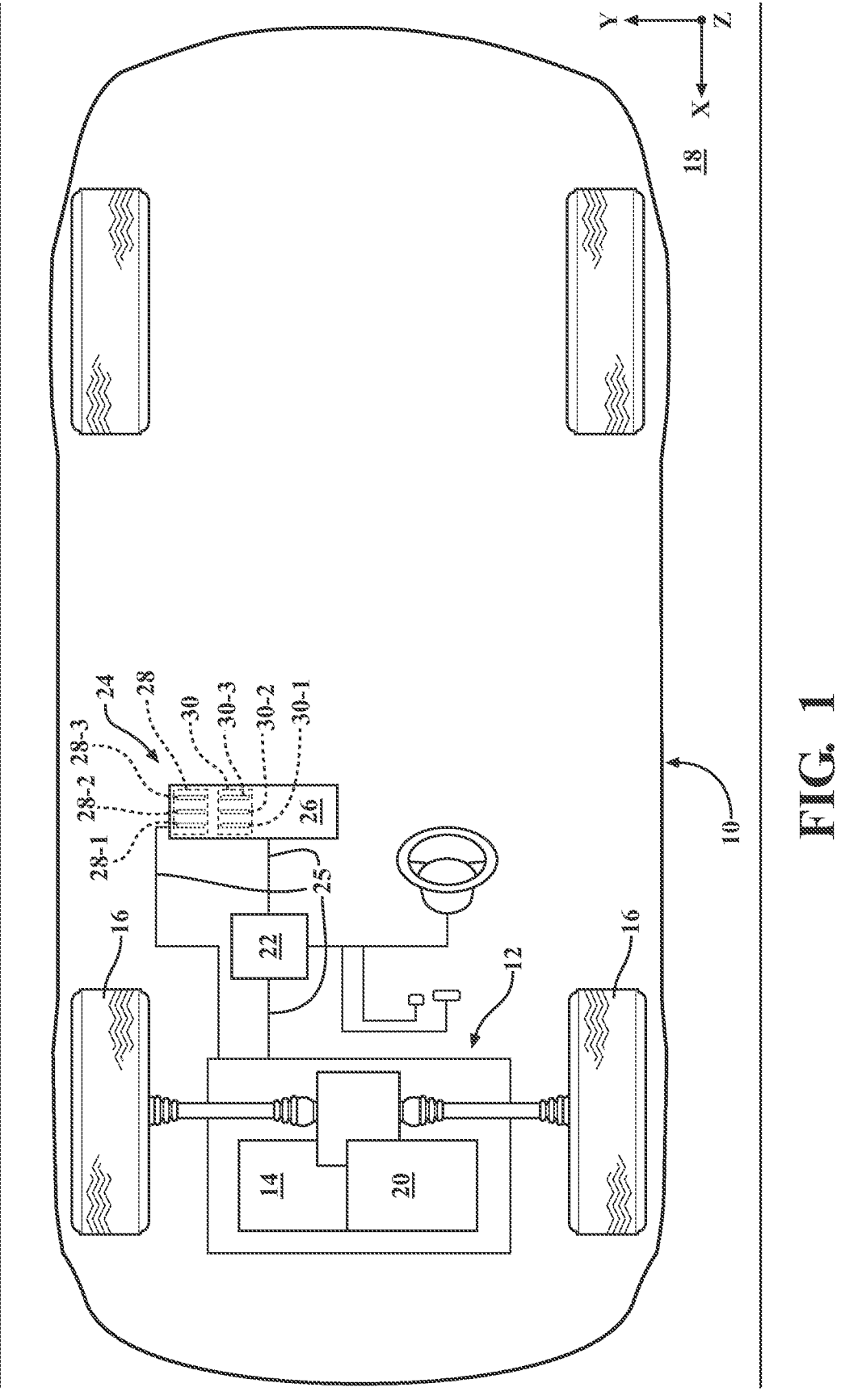
FIG. 1 is a schematic top view of an embodiment of a motor vehicle employing multiple power-sources and a battery system having a multi-cell rechargeable energy storage system (RESS) configured to generate and store electrical energy.

Referring to FIG. 1, a motor vehicle 10 having a powertrain 12 is depicted. The vehicle 10 may include, but not be limited to, a commercial vehicle, industrial vehicle, passenger vehicle, aircraft, watercraft, train or the like. It is also contemplated that the vehicle 10 may be a mobile platform, such as an airplane, all-terrain vehicle (ATV), boat, personal movement apparatus, robot and the like to accomplish the purposes of this disclosure. The powertrain 12 includes a power-source 14 configured to generate a power-source torque for propulsion of the vehicle 10 via driven wheels 16 relative to a road surface 18. The power-source 14 is depicted as an electric motor-generator; consequently, the motor vehicle 10 may be identified as an electric vehicle (EV).

As shown in FIG. 1, the powertrain 12 may also include an additional power-source 20, such as an internal combustion engine. The power-sources 14 and 20 may act in concert to power the motor vehicle 10. The motor vehicle 10 additionally includes an electronic controller 22 and a multi-cell rechargeable energy storage system (RESS) 24 configured to generate and store electrical energy through heat-producing electro-chemical reactions for supplying the electrical energy to the power-sources 14 and 20. The electronic controller 22 may be a central processing unit (CPU) that regulates various functions of the vehicle 10, or as a powertrain control module (PCM) configured to control the powertrain 12 to generate a predetermined amount of power-source torque. The RESS 24 may be connected to the power-sources 14 and 20, the electronic controller 22, as well as other vehicle systems via a high-voltage BUS 25. Although the RESS 24 is described herein primarily with respect to a motor vehicle environment, nothing precludes the subject RESS from being employed for powering other, non-automotive or stationary systems.

With continued reference to FIG. 1, the RESS 24 includes one or more sections or arrays 26 of individual battery cells arranged with respect to an X-Y-Z coordinate system. Each battery cell array 26 may be configured as a battery module or a number of battery modules bundled into a battery pack. The array 26 includes a plurality of battery cells, such as a first group of battery cells 28 and a neighboring, directly adjacent, second group of battery cells 30, each extending generally upward, i.e., in the Z direction. Although one array 26 (illustrated as a battery pack) and two groups of battery cells 28, 30 (illustrated as individual modules) are specifically indicated, nothing precludes the RESS 24 from having a greater number of such arrays with a particular number of battery cells arranged therein. As shown, the first cell group 28 includes individual battery cells 28-1, 28-2, 28-3, while the neighboring second cell group 30 includes individual battery cells 30-1, 30-2, 30-3. Individual battery cells in groups 28 and 30 may be cylindrically shaped, a.k.a., cylindrical cells.

Figure 2:
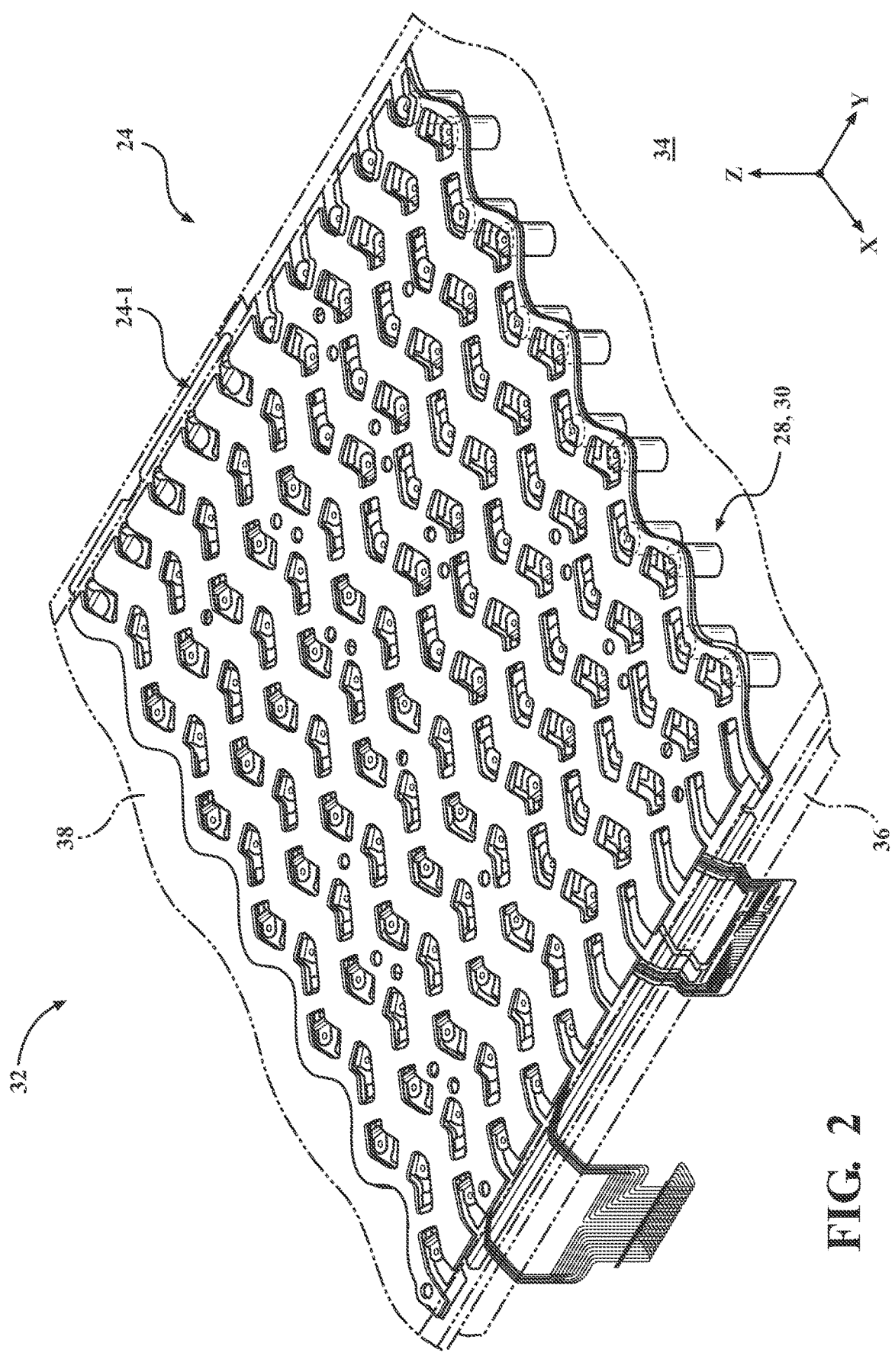
FIG. 2 is a schematic perspective top view of the RESS shown in FIG. 1, illustrating an RESS housing having a tray and a cover enclosing the battery cells and a structural senseline assembly, according to the present disclosure.
Figure 3:
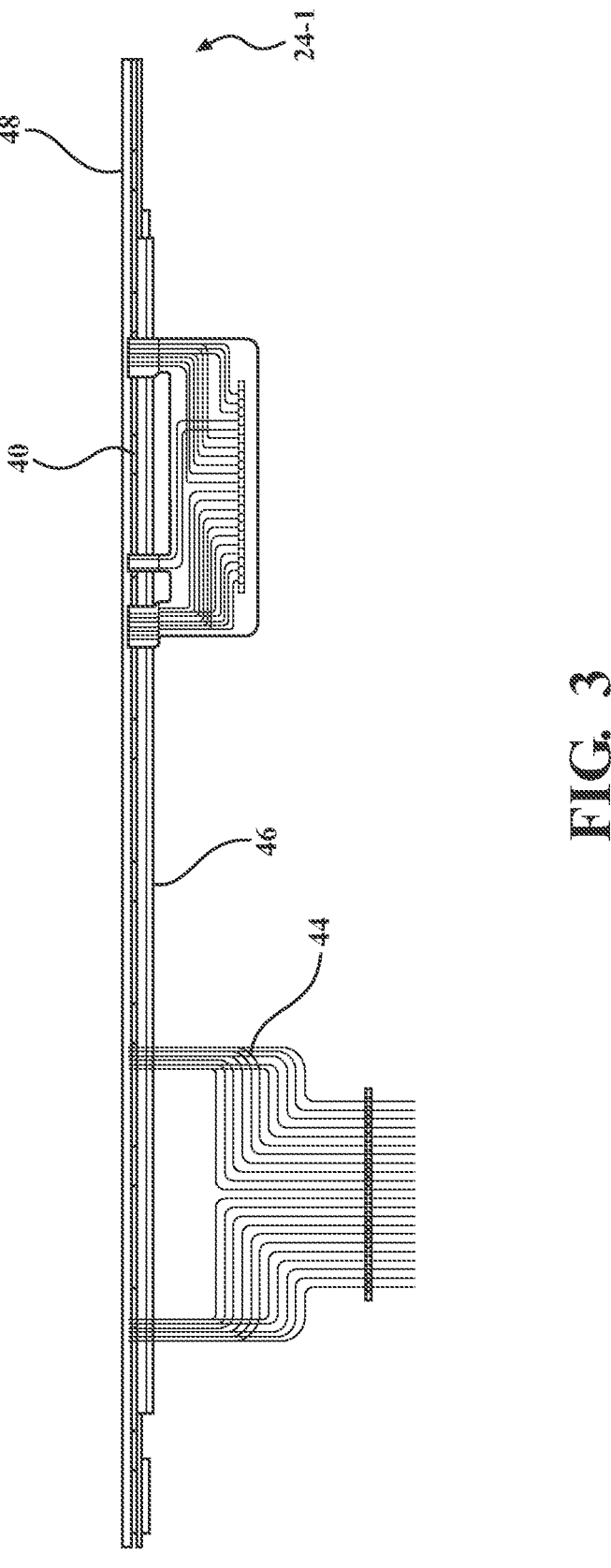
FIG. 3 is a schematic front view of the structural senseline assembly shown in FIG. 2, according to the present disclosure.
Figure 4:
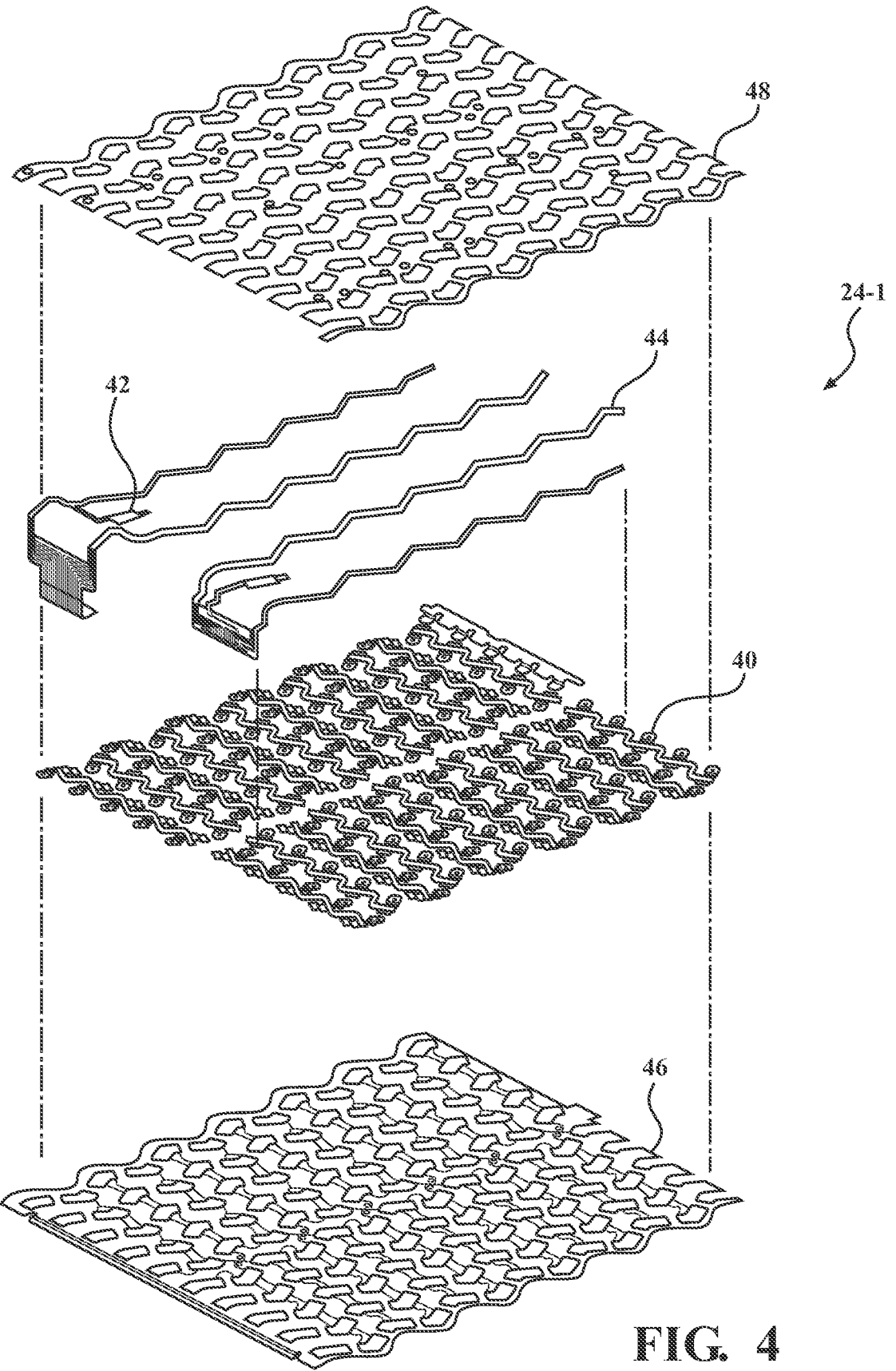
FIG. 4 is a schematic exploded view of the structural senseline assembly shown in FIG. 2, according to the present disclosure.
Figure 5:
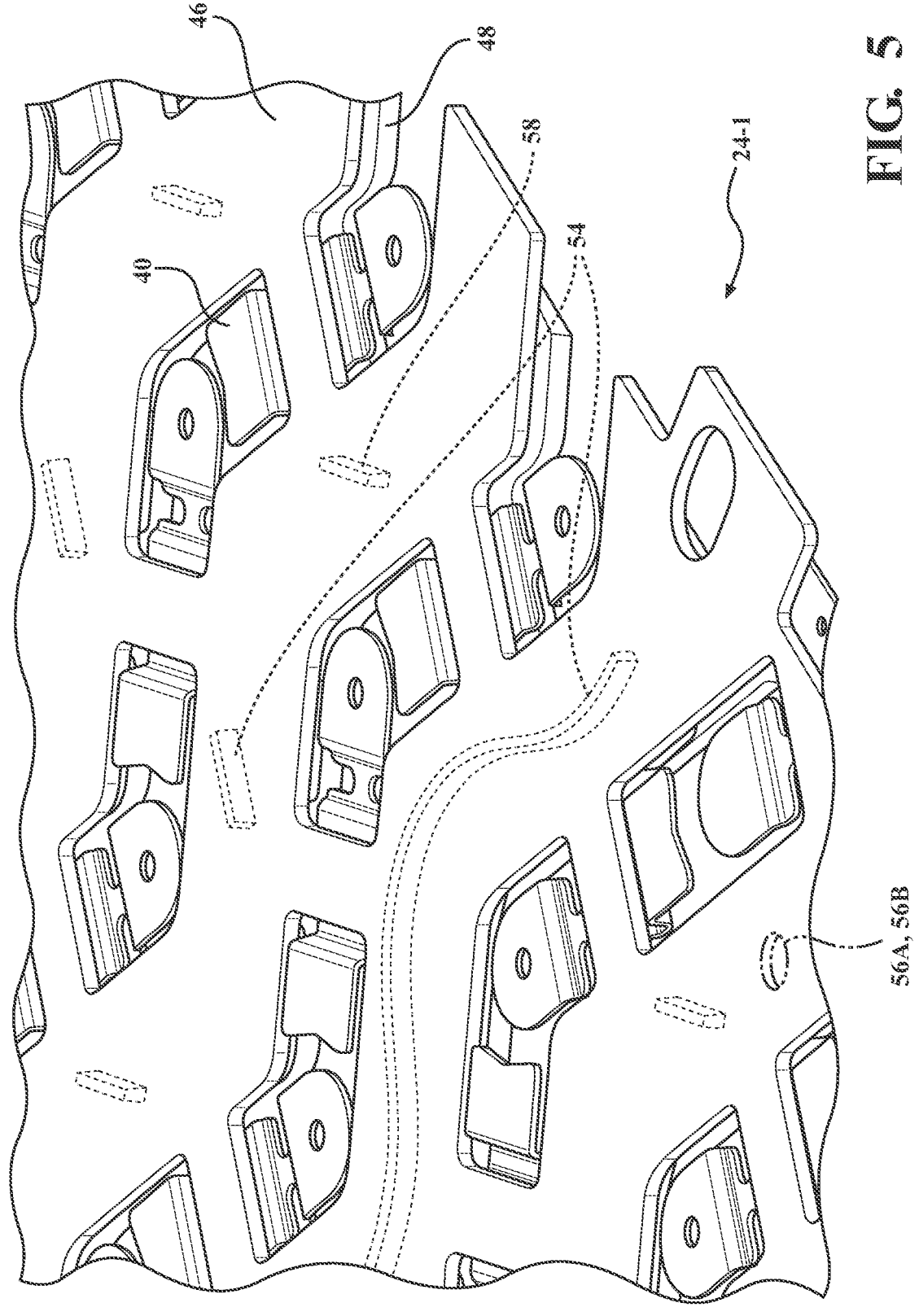
FIG. 5 is a close-up schematic perspective partial bottom view of the structural senseline assembly shown in FIG. 2, illustrating an embodiment of load transfer ribs on a first interconnect board (ICB), according to the disclosure.

As shown in FIG. 2, the RESS 24 also includes an RESS housing or enclosure 32 configured to accommodate and retain each of the first and second battery cell groups 28, 30. The RESS enclosure 32 is surrounded by an ambient environment 34, i.e., environment external to the RESS enclosure. The RESS enclosure 32 is configured to manage high-temperature gases emitted by battery cells in the cell groups 28, 30, such as during a battery cell thermal runaway event, and expel the high-temperature gases to the external environment 34. The RESS enclosure 32 includes an enclosure tray 36 and an enclosure cover 38. The enclosure cover 38 is generally positioned above the battery cells 28-1, 28-2, 28-3 and 30-1, 30-2, 30-3.

The enclosure cover 38 is configured to engage the enclosure tray 36 to substantially seal the RESS enclosure 32 and its contents from the external environment 34. As shown, the RESS enclosure 32 is arranged in a horizontal X-Y plane, such that the enclosure cover 38 is positioned above the enclosure tray 36 when viewed along a Z-axis. The RESS 24 may also include a heat sink (not shown). The heat sink is generally positioned below or between the battery cells of the first and second battery cell groups 28, 30 and in direct contact therewith, to thereby absorb thermal energy from the respective battery cells and maintain requisite RESS 24 operating conditions. For example, the RESS enclosure 32 may be configured as a structural unit with the intent of withstanding external loads, such as in a body structure of the motor vehicle 10.

As shown in FIGS. 3-6, the RESS 24 also includes a busbar subassembly 40 disposed within the RESS enclosure 32. The busbar subassembly 40 is configured to electrically connect and transmit electrical signals to and from the battery cells in the array 26. The RESS 24 additionally includes at least one sensing device 42 (such as a thermistor, a fuse, etc.) disposed within the RESS enclosure 32 and configured to detect operation of at least one of the plurality of battery cells in the array 26. A sensing circuit 44 is disposed within the RESS enclosure 32 and is electrically connected to each of the busbar subassembly 40 and the sensing device(s) 42. The sensing circuit 44 may be generally flexible and is configured to communicate electrical signals from the busbar subassembly 40 and the sensing device(s) 42 to an electronic controller arranged in the external environment, such as the electronic controller 22 of the motor vehicle 10.

Figure 6:
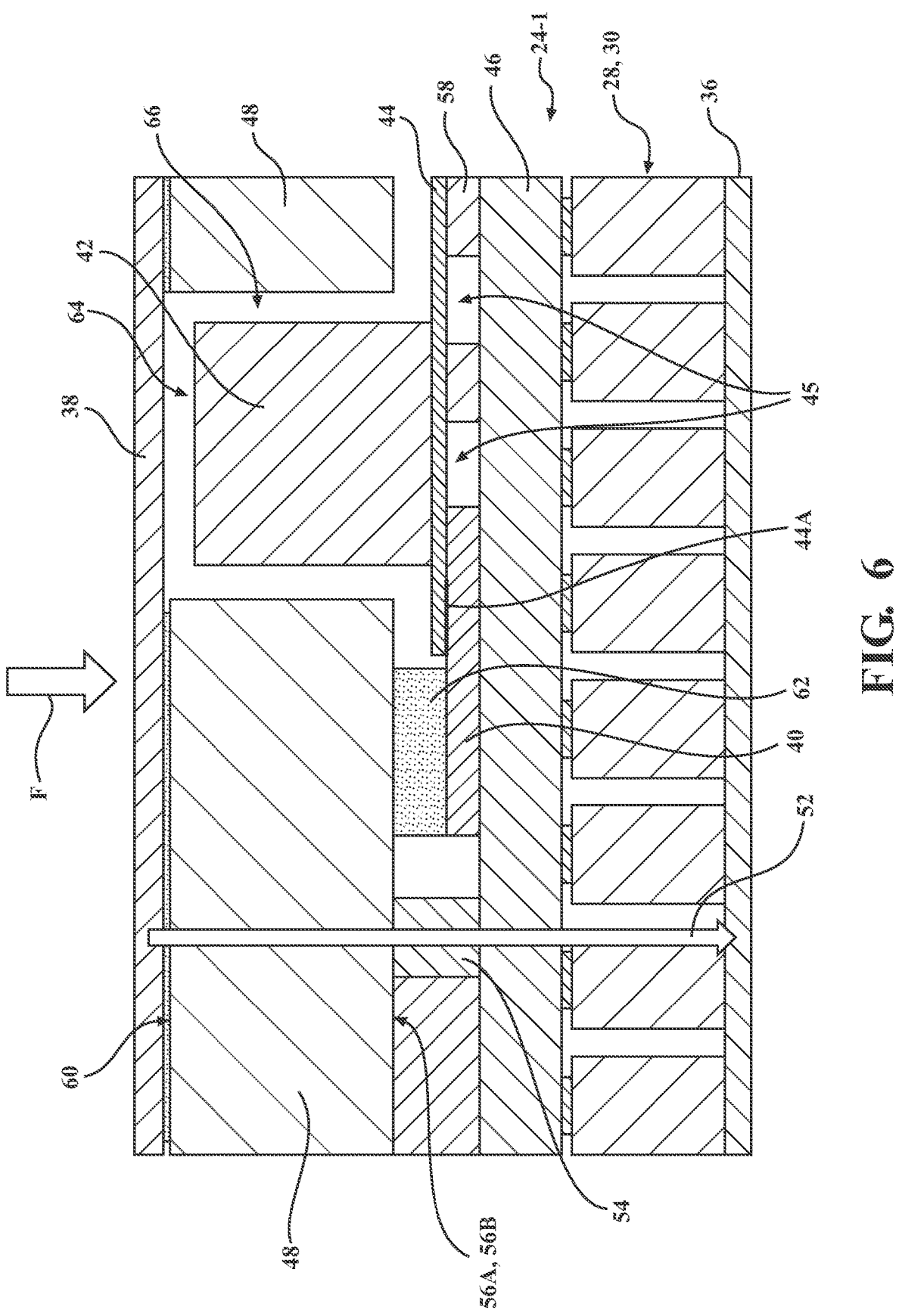
FIG. 6 is a schematic cross-sectional plan view of the RESS in FIG. 2, illustrating component special arrangement, as well as weld and adhesive interfaces, according to the disclosure.

As shown in FIG. 6, the sensing circuit 44 may include sections of masking or isolation film 44A to electrically isolate the circuit from the busbar subassembly 40. The isolation film 44A may be applied to the entire sensing circuit 44 and then have certain sections removed in select locations where an electrical connection to the busbar subassembly 40 is required, such as in locations 45 shown in FIG. 6 depicting a cross-sectional view of the RESS 24. With continued reference to FIGS. 3-6, the RESS 24 additionally includes a first or lower interconnect board (ICB) 46 disposed between the plurality of battery cells in the array 26 and the busbar subassembly 40. The first ICB 46 may be fixed, such as snapped-on, adhesively bonded, or otherwise attached to the battery cells of the array 26.

The RESS 24 further includes a second or upper ICB 48. The second ICB 48 is disposed between the enclosure cover 38 and the busbar subassembly 40. The second ICB 48 is configured to structurally connect the enclosure cover 38 to the first ICB 46 and transmit physical forces F between the enclosure cover and the enclosure tray 36. The connection created between the enclosure cover 38 and the first ICB 46 generates a load path 52 (shown in FIG. 6) from the enclosure cover 38 to the enclosure tray 36 in bypass of at least the busbar subassembly 40, the sensing device(s) 42, and the sensing circuit 44. The RESS 24 is intended to act as a solid unit or a "brick" once the ICBs 46 and 48 are joined. The RESS 24 employing such construction may be used as a structural or load-bearing unit, for example in the motor vehicle 10.

As a consequence of the load path 52 passing through the first ICB 46 and the second ICB 48, externally applied forces F will be transmitted through the RESS enclosure 32 via the plurality of battery cells and the ICBs, generally bypassing and physically protecting other RESS pack internals. Thus interconnected, the busbar subassembly 40, the sensing device(s) 42, the sensing circuit 44, the first ICB 46, and the second ICB 48 are constituent parts of an internal RESS "senseline" assembly. Within the context of the present disclosure, owing to the purposeful structural arrangement and the specific load bearing path 52 through the above components, the disclosed arrangement of subject components is termed a structural senseline assembly 24-1, which is identified in FIGS. 2-6. The first ICB 46 is configured to position, i.e., locate, as well as fix and support, each of the sensing circuit 44 and the busbar subassembly 40 within the structural senseline 24-1. The first ICB 46 is also configured to electrically isolate the busbar subassembly from the first and second battery cell groups 28, 30. The above arrangement of the first ICB 46 also locates or positions the sensing device(s) 42 relative to the busbar subassembly 40 and the entire structural senseline 24-1 to the battery cells in groups 28, 30.

As shown in FIG. 6, the first ICB 46 and/or the second ICB 48 may include one or more ribs 54 projecting through a joining area between the two ICBs. Each rib 54 is configured to transfer the physical forces F between the first and the second ICBs 46, 48. The structural senseline assembly 24-1 may further include either an adhesive layer 56A or a weld interface 56B disposed between the first ICB 46 and the second ICB 48. The adhesive layer 56A or the weld interface 56B may be arranged on the respective rib(s) 54. Consequently, the forces F may be transmitted between the first and second ICBs 46, 48 through either the adhesive layer 56A or the weld interface 56B. Each of the first ICB 46 and the second ICB 48 may be constructed from a polymer, such as a glass-filled nylon. In such an embodiment, the weld interface 56B may, for example, be an ultrasonic weld, a laser weld, or a heat stake configured to fix the first ICB 46 to the second ICB 48.

Additionally, as shown in FIG. 6, the first ICB 46 may include one or more ribs 58 configured to generate space for the busbar subassembly 40 between the sensing circuit 44 and the main body of the first ICB, as well as support the sensing circuit 44 inside the RESS enclosure 32. The RESS 24 may additionally include an adhesive layer 60 disposed between the enclosure cover 38 and the second ICB 48. Also, the RESS 24 may include an adhesive layer 62 disposed between the second ICB 48 and the busbar subassembly 40, thereby fixing the two components relative to one another. The structural senseline assembly 24-1 may define an open or free space 64 between the sensing device(s) 42 and the enclosure cover 38. The structural senseline assembly 24-1 may also define an open space 66 between the sensing device(s) 42 and the second ICB 48. The free spaces 64 and 66 are intended to avert transfer of the force F to the sensing device(s) 42 from either the first ICB 46 or the second ICB 48.

In summary, the RESS enclosure 32 in cooperation with the battery cells and the structural senseline assembly 24-1- including the busbar subassembly 40, the sensing device(s) 42, the sensing circuit 44, the first ICB 46, and the second ICB 48-is configured to transmit physical forces through RESS structural components, while protecting the busbar subassembly, the sensing device(s), and the sensing circuit from possible damage. Specifically, the RESS 24 is configured to operate as a solid unit and generally direct external forces through the enclosure cover 38, the first ICB 46, the second ICB 48, the battery cells, and the enclosure tray 36. The RESS 24 structure is thereby configured to create a load path 52 that permits significant forces to bypass sensitive and/or fragile internal components, such as the busbar subassembly 40, the sensing device(s) 42, and the sensing circuit 44. The first ICB 46 and the second ICB 48 may include various projections and fastening means to route the load path around the nearby sensitive and/or fragile internal components for protection thereof.

The detailed description and the drawings or figures are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment may be combined with one or a plurality of other desired characteristics from other embodiments, resulting in other embodiments not described in words or by reference to the drawings. Accordingly, such other embodiments fall within the framework of the scope of the appended claims.

What is claimed is:

1. A multi-cell rechargeable energy storage system (RESS) comprising:

an RESS enclosure surrounded by an external environment and having an enclosure tray and an enclosure cover;

a plurality of battery cells arranged in one or more battery modules and mounted to the enclosure tray; and a structural senseline assembly including:

a busbar subassembly disposed within the RESS enclosure and configured to electrically connect the plurality of battery cells;

a sensing device disposed within the RESS enclosure and configured to detect operation of at least one of the plurality of battery cells;

a sensing circuit disposed within the RESS enclosure and electrically connected to each of the busbar subassembly and the sensing device to communicate electrical signals therefrom to an electronic controller arranged in the external environment;

a first interconnect board (ICB) disposed between the plurality of battery cells and the busbar subassembly and configured to position the sensing circuit and the busbar subassembly within the structural senseline assembly, position the sensing device relative to the busbar subassembly and the structural senseline assembly to the plurality of battery cells, and space apart and isolate the busbar subassembly from the plurality of battery cells; and a second ICB disposed between the enclosure cover and the busbar subassembly and configured to structurally connect the enclosure cover to the first ICB and transmit physical forces between the enclosure cover and the enclosure tray;

wherein the physical forces are transmitted in a load path from the enclosure cover to the enclosure tray via the first and second ICB's and the plurality of battery cells in bypass of the busbar subassembly, the sensing device, and the sensing circuit.

2. The RESS of claim 1, further comprising an adhesive layer disposed between the enclosure cover and the second ICB.

3. The RESS of claim 1, wherein at least one of the first ICB and the second ICB includes one or more configured to transfer the physical forces between the first and the second ICBs.

4. The RESS of claim 1, further comprising one of an adhesive layer and a weld interface disposed between the first ICB and the second ICB.

5. The RESS of claim 4, wherein the weld interface is one of an ultrasonic weld, a laser weld, and a heat stake.

6. The RESS of claim 1, further comprising an adhesive layer disposed between the second ICB and the busbar subassembly.

7. The RESS of claim 1, wherein the physical forces are transmitted through the first ICB, the second ICB, and the plurality of battery cells.

8. The RESS of claim 1, wherein the structural senseline assembly defines an open space between the sensing device and the enclosure cover.

9. The RESS of claim 1, wherein the structural senseline assembly defines an open space between the sensing device and the second ICB.

10. The RESS of claim 1, wherein the first ICB includes one or more ribs configured to support the sensing circuit.

11. A motor vehicle comprising:

a power-source configured to generate power-source torque;

an electronic controller; and a multi-cell rechargeable energy storage system (RESS) configured to supply electrical energy to the power-source, the RESS including:

an RESS enclosure having an enclosure tray and an enclosure cover;

a plurality of battery cells arranged in one or more battery modules and mounted to the enclosure tray; and a structural senseline assembly including:

a busbar subassembly disposed within the RESS enclosure and configured to electrically connect the plurality of battery cells;

a sensing device disposed within the RESS enclosure and configured to detect operation of at least one of the plurality of battery cells;

a sensing circuit disposed within the RESS enclosure and electrically connected to each of the busbar subassembly and the sensing device to communicate electrical signals therefrom to the electronic controller;

a first interconnect board (ICB) disposed between the plurality of battery cells and the busbar subassembly and configured to position the sensing circuit and the busbar subassembly within the structural senseline assembly, position the sensing device relative to the busbar subassembly and the structural senseline assembly to the plurality of battery cells, and space apart and isolate the busbar subassembly from the plurality of battery cells; and a second ICB disposed between the enclosure cover and the busbar subassembly and configured to structurally connect the enclosure cover to the first ICB and transmit physical forces between the enclosure cover and the enclosure tray;

wherein the physical forces are transmitted in a load path from the enclosure cover to the enclosure tray via the first and second ICB's and the plurality of battery cells in bypass of the busbar subassembly, the sensing device, and the sensing circuit.

12. The motor vehicle of claim 11, wherein the RESS additionally includes an adhesive layer disposed between the enclosure cover and the second ICB.

13. The motor vehicle of claim 11, wherein at least one of the first ICB and the second ICB includes one or more ribs configured to transfer the physical forces between the first and the second ICBs.

14. The motor vehicle of claim 11, wherein the RESS additionally includes one of an adhesive layer and a weld interface disposed between the first ICB and the second ICB, and wherein the weld interface is one of an ultrasonic weld, a laser weld, and a heat stake.

15. The motor vehicle of claim 11, wherein the RESS additionally includes an adhesive layer disposed between the second ICB and the busbar subassembly.

16. The motor vehicle of claim 11, wherein the physical forces are transmitted through the first ICB, the second ICB, and the plurality of battery cells.

17. The motor vehicle of claim 11, wherein the structural senseline assembly defines an open space between the sensing device and the enclosure cover.

18. The motor vehicle of claim 11, wherein the structural senseline assembly defines an open space between the sensing device and the second ICB.

19. The motor vehicle of claim 11, wherein the first ICB includes one or more ribs configured to support the sensing circuit.

20. A motor vehicle comprising:

a power-source configured to generate power-source torque;

an electronic controller; and a multi-cell rechargeable energy storage system (RESS) configured to supply electrical energy to the power-source, the RESS including:

an RESS enclosure having an enclosure tray and an enclosure cover;

a plurality of cylindrical battery cells arranged in one or more battery modules and mounted to the enclosure tray; and a structural senseline assembly including:

a busbar subassembly disposed within the RESS enclosure and configured to electrically connect the plurality of cylindrical battery cells;

a sensing device disposed within the RESS enclosure and configured to detect operation of at least one of the plurality of cylindrical battery cells;

a sensing circuit disposed within the RESS enclosure and electrically connected to each of the busbar subassembly and the sensing device to communicate electrical signals therefrom to the electronic controller;

a first interconnect board (ICB) disposed between the plurality of cylindrical battery cells and the busbar subassembly and configured to position the sensing circuit and the busbar subassembly within the structural senseline assembly, position the sensing device relative to the busbar subassembly and the structural senseline assembly to the plurality of cylindrical battery cells, and space apart and isolate the busbar subassembly from the plurality of cylindrical battery cells; and a second ICB disposed between the enclosure cover and the busbar subassembly and configured to structurally connect to-the enclosure cover to the first ICB and transmit physical forces between the enclosure cover and the enclosure tray;

wherein:

the physical forces are transmitted in a load path from the enclosure cover to the enclosure tray via the first and second ICB's and the plurality of battery cells in bypass of the busbar subassembly, the sensing device, and the sensing circuit;

at least one of the first ICB and the second ICB includes one or more ribs configured to transfer the physical forces between the first and the second ICBs; and the first ICB includes one or more ribs configured to support the sensing circuit.

* * * * *